(12) United States Patent
Wujek et al.

(10) Patent No.: US 11,867,424 B1
(45) Date of Patent: Jan. 9, 2024

(54) THERMAL CONTROL SYSTEM

(71) Applicants: Scott Wujek, San Jose, CA (US); Kegan J. Connick, San Jose, CA (US); Paul D. Yeomans, Morgan Hill, CA (US)

(72) Inventors: Scott Wujek, San Jose, CA (US); Kegan J. Connick, San Jose, CA (US); Paul D. Yeomans, Morgan Hill, CA (US)

(73) Assignee: APPLE INC., Cupertino, CA (US)

( * ) Notice: Subject to any disclaimer, the term of this patent is extended or adjusted under 35 U.S.C. 154(b) by 221 days.

(21) Appl. No.: 17/183,438

(22) Filed: Feb. 24, 2021

Related U.S. Application Data

(60) Provisional application No. 62/985,444, filed on Mar. 5, 2020.

(51) Int. Cl.
 *F24F 12/00* (2006.01)
 *B60H 1/00* (2006.01)
 *F24F 110/10* (2018.01)

(52) U.S. Cl.
 CPC ....... *F24F 12/006* (2013.01); *B60H 1/00028* (2013.01); *F24F 2012/007* (2013.01); *F24F 2110/10* (2018.01)

(58) Field of Classification Search
 CPC ................. F24F 12/006; F24F 2110/10; F24F 2012/007; B60H 1/00028; B60H 1/0005; B60H 1/00057; B60H 1/00849; B60H 1/00857; B60H 1/00864
 See application file for complete search history.

(56) References Cited

U.S. PATENT DOCUMENTS

| | | | |
|---|---|---|---|
| 3,732,703 A | 5/1973 | Nordstrom et al. | |
| 4,316,363 A | 2/1982 | McKirdy | |
| 6,901,765 B2 | 6/2005 | Amaral et al. | |
| 2003/0131613 A1* | 7/2003 | Mardberg | B60H 1/00878 62/155 |
| 2014/0075973 A1* | 3/2014 | Graaf | B60H 1/00057 165/104.21 |
| 2014/0075974 A1* | 3/2014 | Klein | B60H 1/00028 62/119 |
| 2015/0107815 A1* | 4/2015 | Hhraguchi | B60H 1/00057 |
| 2016/0229266 A1* | 8/2016 | Maeda | B60H 1/0005 |

(Continued)

*Primary Examiner* — Travis Ruby
*Assistant Examiner* — Christopher C Pillow
(74) *Attorney, Agent, or Firm* — Young Basile Hanlon & MacFarlane, P.C.

(57) ABSTRACT

A thermal control system includes a housing defining an intake flow path for travel of intake airflow and an exhaust flow path for travel of exhaust airflow. An intake door is disposed along the intake flow path and has first and second positions blocking and allowing intake airflow through the intake door. An exhaust door is disposed along the exhaust flow path and has first and second positions blocking and allowing exhaust airflow through the exhaust door. A mode door is disposed in the housing between the intake flow path and the exhaust flow path with a first position blocking the intake airflow and allowing the exhaust airflow to pass through a heat exchanger, a second position blocking the exhaust airflow and allowing the intake airflow to pass through the heat exchanger, and a third position allowing the intake airflow and the exhaust airflow to pass through the heat exchanger.

22 Claims, 9 Drawing Sheets

(56) References Cited

U.S. PATENT DOCUMENTS

| | | | |
|---|---|---|---|
| 2017/0174040 A1* | 6/2017 | Feltham | B60H 1/00021 |
| 2017/0299232 A1* | 10/2017 | Richter | B60H 1/00057 |
| 2017/0305230 A1* | 10/2017 | Sekito | B60H 1/00842 |
| 2018/0009287 A1* | 1/2018 | Shin | B60H 1/00899 |
| 2018/0022188 A1* | 1/2018 | Kakizaki | B60H 1/00335 |
| | | | 165/202 |
| 2018/0093545 A1* | 4/2018 | Park | B60H 1/00057 |
| 2018/0093548 A1* | 4/2018 | Ceperkovic | B60H 1/00921 |
| 2019/0176565 A1* | 6/2019 | Shin | B60H 1/00835 |
| 2020/0215873 A1* | 7/2020 | Suzuki | B60H 1/00871 |
| 2021/0300155 A1* | 9/2021 | Kanou | B60H 1/00878 |

\* cited by examiner

THERMAL CONTROL SYSTEM

CROSS-REFERENCE TO RELATED APPLICATION(S)

This application claims the benefit of U.S. Provisional Application No. 62/985,444, filed on Mar. 5, 2020. The content of the foregoing application is incorporated herein by reference in its entirety for all purposes.

TECHNICAL FIELD

This disclosure relates generally to thermal control systems and in particular to configurations of a heat-pump-based thermal control system and operational modes for the thermal control system.

BACKGROUND

Heating can be difficult when excess, waste, or by-product heat is limited. Some systems use positive-temperature coefficient (PTC) heaters with ceramic components that vary in electrical resistance depending on operational temperatures. However, high current levels and high power consumption are required to operate PTC heaters in cold temperature environments, expending high levels of energy. In a thermal control system using a heat pump, working fluid such as refrigerant in a thermal loop can be forced through a cycle of evaporation or heating to absorb heat then condensation or cooling to release heat. Air warmed by the released heat can be directed for warming before exiting, for example, through an exhaust path or recirculation path.

SUMMARY

One aspect of the disclosed embodiments is a thermal control system including a housing defining an intake flow path for travel of intake airflow and an exhaust flow path for travel of exhaust airflow. The thermal control system includes an intake door disposed in the housing along the intake flow path, the intake door having a first position blocking the intake airflow from passing through the intake door and a second position allowing the intake airflow to pass through the intake door. The thermal control system includes an exhaust door disposed in the housing along the exhaust flow path, the exhaust door having a first position blocking the exhaust airflow from passing through the exhaust door and a second position allowing the exhaust airflow to pass through the exhaust door. The thermal control system includes a mode door disposed in the housing between the intake flow path and the exhaust flow path, the mode door having a first position blocking the intake airflow from passing through a heat exchanger and allowing the exhaust airflow to pass through the heat exchanger, a second position blocking the exhaust airflow from passing through the heat exchanger and allowing the intake airflow to pass through the heat exchanger, and a third position allowing the intake airflow and the exhaust airflow to pass through the heat exchanger.

Another aspect of the disclosed embodiments is a thermal control system including a thermal module defining an intake flow path for travel of intake airflow and an exhaust flow path for travel of exhaust airflow. The thermal control system includes a thermal loop circulating a working fluid. The thermal loop includes a first heat exchanger configured to heat the working fluid and a second heat exchanger configured to cool the working fluid. The first heat exchanger is positioned in the intake flow path and in the exhaust flow path and is configured to cool the intake airflow and the exhaust airflow that passes through the first heat exchanger. The second heat exchanger is positioned downstream of the first heat exchanger in the intake flow path and is configured to heat the intake airflow that passes through the second heat exchanger. The thermal control system includes a mode door disposed in the thermal module between the intake flow path and the exhaust flow path. The mode door has a first position blocking the intake airflow from passing through the first heat exchanger and allowing the exhaust airflow to pass through the first heat exchanger, a second position blocking the exhaust airflow from passing through the first heat exchanger and allowing the intake airflow to pass through the first heat exchanger, and a third position allowing the intake airflow and the exhaust airflow to pass through the first heat exchanger.

Another aspect of the disclosed embodiments is a method of climate control using a thermal control system in a vehicle. The method includes routing intake airflow from an external environment though an intake inlet, along an intake flow path, optionally through a first type of heat exchanger, optionally through a second type of heat exchanger, and through an intake outlet into a vehicle cabin of the vehicle. The method also includes routing exhaust airflow from the vehicle cabin through an exhaust inlet, along an exhaust flow path, optionally through the first type of heat exchanger, optionally through the second type of heat exchanger, and through an exhaust outlet into to the external environment. The first type of heat exchanger and the second type of heat exchanger are different types of heat exchangers. The first type of heat exchanger and the second type of heat exchanger are part of a vehicle thermal loop circulating a working fluid.

DETAILED DESCRIPTION

A thermal control system can combine heat reclamation with a heat-pump configuration to lower power consumption, especially when operating in cold ambient temperatures. Reclaiming or collecting heat that would otherwise be lost can be accomplished by positioning a heat exchanger such as an evaporator in an exhaust flow path that directs exhaust airflow to exit a vehicle cabin. In an example where both intake airflow from a fresh air source and exhaust airflow from a vehicle cabin are routed through the heat exchanger, the described thermal control system can lessen or eliminate icing-and-defrost cycles typically required to operate the heat exchanger when exposed to cold ambient temperatures. The thermal control system described here can also save energy by dehumidifying airflow, such as by first cooling then reheating the air when operating in an air conditioning mode. Examples of heat-pump-based thermal control systems using heat reclamation and dehumidification and the improved performance possible with these thermal control systems are described herein.

Figure 1:
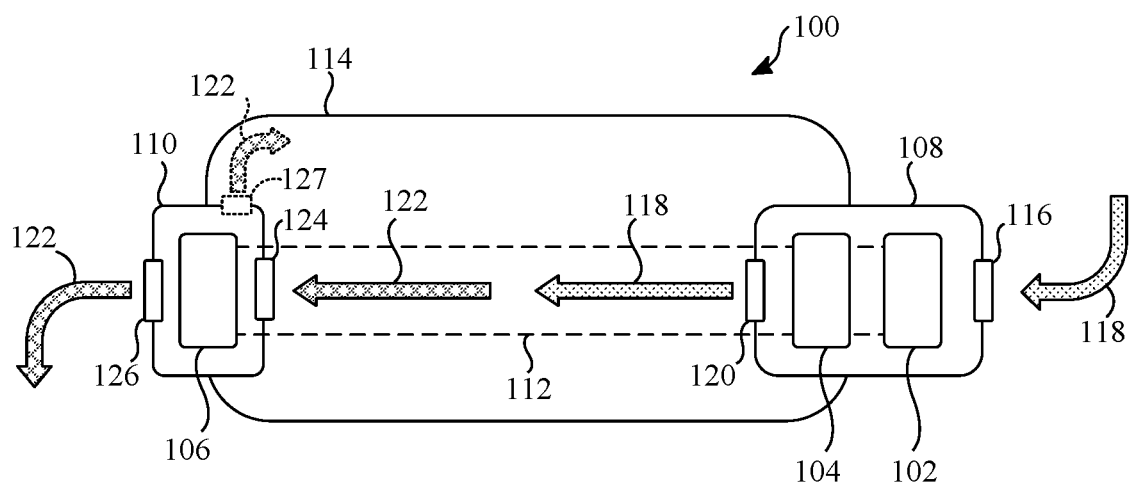
FIG. 1 is a schematic of a thermal control system for use with a vehicle.

FIG. 1 is a schematic of a thermal control system 100 for use with a vehicle. The thermal control system 100 includes heat exchangers 102, 104, 106. The heat exchangers 102, 104, 106 are shown as located within modules or housings 108, 110 and are coupled by a thermal loop 112 shown in dotted line. Though the housings 108, 110 are shown as located at a front and rear of a vehicle cabin 114, other locations for the housings 108, 110, the heat exchangers 102, 104, 106, and the thermal loop 112 in respect to the vehicle cabin 114 are possible. The components are shown schematically in order to describe various thermal conditioning processes implemented using the thermal control system 100.

For example, an intake inlet 116 associated with the housing 108 receives intake airflow 118 from an external environment surrounding the vehicle cabin 114. The intake airflow 118 is denoted using an arrow with a dotted pattern. The intake airflow 118 passes through one or both of the heat exchangers 102, 104 before an intake outlet 120 directs the intake airflow 118 into the vehicle cabin 114. Once in the vehicle cabin 114, the intake airflow 118 transforms to exhaust airflow 122 (e.g., after mixing with air present within the vehicle cabin 114) as denoted using an arrow with a cross-hatched pattern. The exhaust airflow 122 in the vehicle cabin 114 is directed to an exhaust inlet 124 associated with the housing 110. The exhaust airflow 122 passes through the exhaust inlet 124, through the heat exchanger 106, then exits the vehicle cabin 114 through an exhaust outlet 126 where the exhaust airflow 122 is directed, for example, back to the external environment.

The thermal control system 100 can function as a heat pump. In general, heat pumps circulate a working fluid, such as refrigerant, through cycles of evaporation or heating to absorb heat and condensation or cooling to release heat. In the thermal control system of FIG. 1, the thermal loop 112 can circulate a working fluid, such as refrigerant, between the heat exchangers 102, 104, 106. Circulation, evaporation, and condensation of the working fluid in the thermal loop 112 can be achieved using the heat exchangers 102, 104, 106 along with one or more compression devices (not shown) and one or more expansion devices (not shown). The compression device(s) can be configured to pressurize the working fluid in the thermal loop 112. The expansion device(s) can be configured to de-pressurize the working fluid in the thermal loop 112. Changes in pressure of the working fluid in the thermal loop 112 allow changes in temperature of airflow to be implemented using the heat exchangers 102, 104, 106.

To operate the thermal control system 100 in the heat-pump configuration, the heat exchanger 102 can be a first type of heat exchanger that is configured to heat or evaporate the working fluid that passes through the heat exchanger 102 from the thermal loop 112. The heat exchanger 102 can cool or receive heat from the intake airflow 118 that passes across or through the heat exchanger 102. This first type of heat exchanger can be, for example, an evaporator. The heat exchanger 104 can be a second type of heat exchanger that is configured to cool or condense the working fluid that passes through the heat exchanger 104 from the thermal loop 112. The heat exchanger 104 can heat or send heat to the intake airflow 118 that passes across or through the heat exchanger 104. This second type of heat exchanger can be, for example, a gas cooler, a resistance heater, a condenser, or combinations thereof.

For improved heat-pump operation of the thermal control system 100, especially when operating in cold environments, the heat exchanger 106 can be used to recover heat from the exhaust airflow 122 as it exits the vehicle cabin 114. The heat exchanger 106 can be located in parallel with the heat exchangers 102, 104 along the thermal loop 112. The heat exchanger 106 can be configured to cool or receive heat from the exhaust airflow 122 that passes across or through the heat exchanger 106 as the exhaust airflow 122 routes from the vehicle cabin 114, through the housing 110, to the external environment. To collect heat, the heat exchanger 106 can be the first type of heat exchanger, that is, a common or similar type as the heat exchanger 102, such as an evaporator.

A vehicle using the thermal control system 100 in the improved heat-pump configuration can thus reclaim or collect heat from the exhaust airflow 122 exiting the vehicle cabin 114 using the heat exchanger 106. The heat collected or reclaimed from the exhaust airflow 122 can be put to other uses in the vehicle, including for continued use in optimizing performance of the thermal control system 100. The thermal control system 100 provides even temperature control to all occupants within the vehicle cabin 114 when the intake inlet 116 is located at a front of the vehicle cabin 114 and the exhaust outlet 124 is located at a back of the vehicle cabin 114, and airflow assisted by pressure differentials between these locations can reduce reliance on fans or pumps to drive the airflow. In other embodiments, additional heat exchangers (not shown) of the first type (e.g., evaporators) can be used to scavenge or reclaim heat from other vehicle systems to further increase efficiency of the thermal control system 100. For example, the thermal loop 112 can include or communicate with one or more heat exchangers (not shown) to collect heat from powertrain components such as the battery, vehicle computer or control systems, or other electronics that produce heat during operation.

Another benefit of the thermal control system 100 is improved durability in cold external environments. The heat exchanger 106 does not experience frost-and-thaw cycles since the exhaust airflow 122 passing through the heat exchanger 106 is generally warmer than the air in cold external environments. The heat-pump configuration of the thermal control system 100 also controls humidity levels within the vehicle cabin 114. Further, reclaiming or collecting heat from the exhaust airflow 122 exiting the vehicle cabin 114 is especially useful in vehicles with hybrid or electric powertrains, since in contrast to vehicles with internal-combustion engines, little or no excess or waste heat is available from the powertrain for use by the thermal control system 100.

The thermal control system 100 can also be configured to use one or more of the heat exchangers 102, 104, 106, one or more compression device(s) (not shown), one or more expansion device(s) (not shown), and one or more valve mechanisms (not shown) in conjunction with the thermal loop 112 to function in an air conditioning mode.

For example, in a warm external environment, the intake airflow 118 can be routed to pass across the heat exchanger 102 to be cooled, be minimally conditioned by or optionally bypass (e.g., using the valve mechanism, not shown) the heat exchanger 104, and enter the vehicle cabin 114 at a cool temperature to mix with the rest of the air in the vehicle cabin 114. The intake airflow 118 can warm slightly as it becomes the exhaust airflow 122, but can also be cooler than ambient air in an external environment. The exhaust airflow 122 can exit the vehicle cabin 114 through the exhaust inlet 124, pass across the heat exchanger 106 to cool the thermal loop 112, then exit the housing 110 to combine with warm ambient air in the external environment. A higher efficiency can be achieved for the thermal control system 100 by heating the exhaust airflow 122 that exits the vehicle cabin 114 in the air conditioning mode. For example, rejecting heat from the thermal loop 112 to the exhaust airflow 122 supports lower power requirements for the one or more compression device(s) (not shown) as a pressurized portion of the thermal loop 112 can be operated at a lower pressure.

To operate the thermal control system 100 in the air conditioning mode, the heat exchanger 102 can be the first type of heat exchanger that is configured to heat or evaporate the working fluid that passes through the heat exchanger 102 from the thermal loop 112. The heat exchanger 102 can receive heat from the intake airflow 118, that is, cool the intake airflow 118, as it passes across or through the heat exchanger 102. This first type of heat exchanger can be, for example, an evaporator.

In the air conditioning mode, the heat exchanger 106 can be used to reject heat or send heat to the exhaust airflow 122 as the exhaust airflow 122 is cooler than ambient air in the warm external environment. The heat exchanger 106 can be configured to heat the exhaust airflow 122 that passes across or through the heat exchanger 106 as the exhaust airflow 122 routes from the vehicle cabin 114, through the housing 110, to the external environment to improve efficiency of the thermal loop 112. To heat the exhaust airflow 122, the heat exchanger 106 can be the second type of heat exchanger, that is, a common or similar type as the heat exchanger 104 that is bypassed in the air conditioning mode, such as a gas cooler, a resistance heater, a condenser, or combinations thereof.

The thermal control system 100 can be optionally designed to perform in an enhanced air conditioning mode, such as with a recirculation option associated with the rear-located housing 110. To support higher efficiency air conditioning using recirculation, the housing 110 can include another exhaust outlet 127 that directs at least a portion of the exhaust airflow 122 back into the vehicle cabin 114 after passing through the heat exchanger 106. For example, in a warm external environment, the intake airflow 118 can pass across the heat exchanger 102 to be cooled, be minimally conditioned by or bypass the heat exchanger 104, and enter the vehicle cabin 114 at a cool temperature to mix with the rest of the air in the vehicle cabin 114. The intake airflow 118 warms up as it becomes the exhaust airflow 122. Then, the exhaust airflow 122 can exit the vehicle cabin 114 through the exhaust inlet 124, pass across the heat exchanger 106 to be cooled, and at least partially reenter the vehicle cabin 114 through the exhaust outlet 127. This optional air conditioning mode with recirculation allows for multiple sources of cool air to be directed at occupants of the vehicle cabin 114.

In another embodiment of the thermal control system 100 (not shown), the housing 110 at the rear of the vehicle cabin 114 can include heat exchangers of both first and second types (e.g., an evaporator and a condenser) in parallel on the thermal loop 112 such that the thermal control system 100 can be operated to reclaim heat as a heat pump and reject heat when operating in the air conditioning mode.

Figure 2:
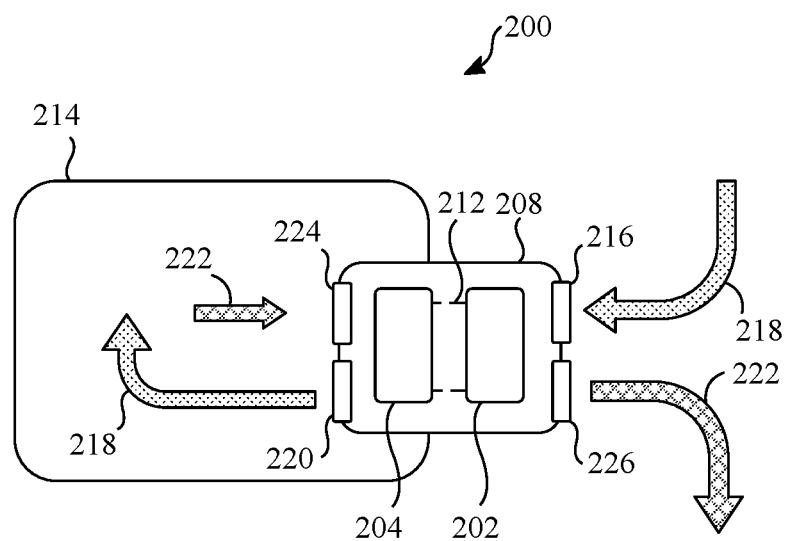
FIG. 2 is a schematic of another thermal control system for use with a vehicle.

FIG. 2 is a schematic of another thermal control system 200 for use with a vehicle. The thermal control system 200 includes heat exchangers 202, 204. The heat exchangers 202, 204 are shown as located within a module or a housing 208 and are coupled by a thermal loop 212 shown in dotted line. Though the housing 208 is shown as located at a front of a vehicle cabin 214, other locations for the housing 208, the heat exchangers 202, 204, and the thermal loop 212 in respect to the vehicle cabin 214 are possible. The components are shown schematically in order to describe various thermal conditioning processes implemented using the thermal control system 200.

For example, an intake inlet 216 associated with the housing 208 receives the intake airflow 218 from an external environment surrounding the vehicle cabin 214. The intake airflow 218 is denoted using an arrow with a dotted pattern. The intake airflow 218 passes through one or both of the heat exchangers 202, 204 before an intake outlet 220 directs the intake airflow 218 into the vehicle cabin 214. Once in the vehicle cabin 214, the intake airflow 218 transforms to exhaust airflow 222 (e.g., after mixing with air present within the vehicle cabin 214) as denoted using an arrow with a cross-hatched pattern. The exhaust airflow 222 in the vehicle cabin 214 is directed to an exhaust inlet 224 associated with the housing 208. The exhaust airflow 222 passes through the exhaust inlet 224, optionally through one or both of the heat exchangers 202, 204, then exits the vehicle cabin 214 through an exhaust outlet 226 where the exhaust airflow 222 is directed, for example, back to the external environment.

The thermal control system 200 can function as a heat pump. For example, the thermal loop 212 can circulate a working fluid, such as refrigerant, between the heat exchangers 202, 204 using a compression device (not shown) and an expansion device (not shown). The heat exchanger 202 can be a first type of heat exchanger that is configured to heat or evaporate the working fluid from the thermal loop 212 to cool or receive heat from the intake airflow 218 and/or the exhaust airflow 222 that passes across or through the heat exchanger 202. This first type of heat exchanger can be, for example, an evaporator. The heat exchanger 204 can be a second type of heat exchanger that is configured to cool or condense the working fluid from the thermal loop 212 to heat or send heat to the intake airflow 218 and/or the exhaust airflow 222 that passes across or through the heat exchanger 204. This second type of heat exchanger can be, for example, a gas cooler or a condenser. Changes in pressure of the working fluid in the thermal loop 212 allow changes in temperature of airflow to be implemented using the heat exchangers 202, 204.

When the thermal control system 200 operates to reclaim heat from the exhaust airflow 222, for example, in cold external environments, the heat exchanger 204 of the second type can be used to heat or send heat to the intake airflow 218 and the heat exchanger 202 of the first type can be used to cool or receive heat from the exhaust airflow 222. When the thermal control system 200 operates to improve cooling efficiency, for example, in hot external environments, the heat exchanger 202 of the first type can be used to cool or receive heat from the intake airflow 218 and the heat exchanger 204 of the second type can be used to heat or send heat to the exhaust airflow 222. Various operational modes of the thermal control system 200 and benefits related to function of the thermal control system 200 in the operational modes are described in additional detail in respect to FIGS. 3-6.

Figure 3:
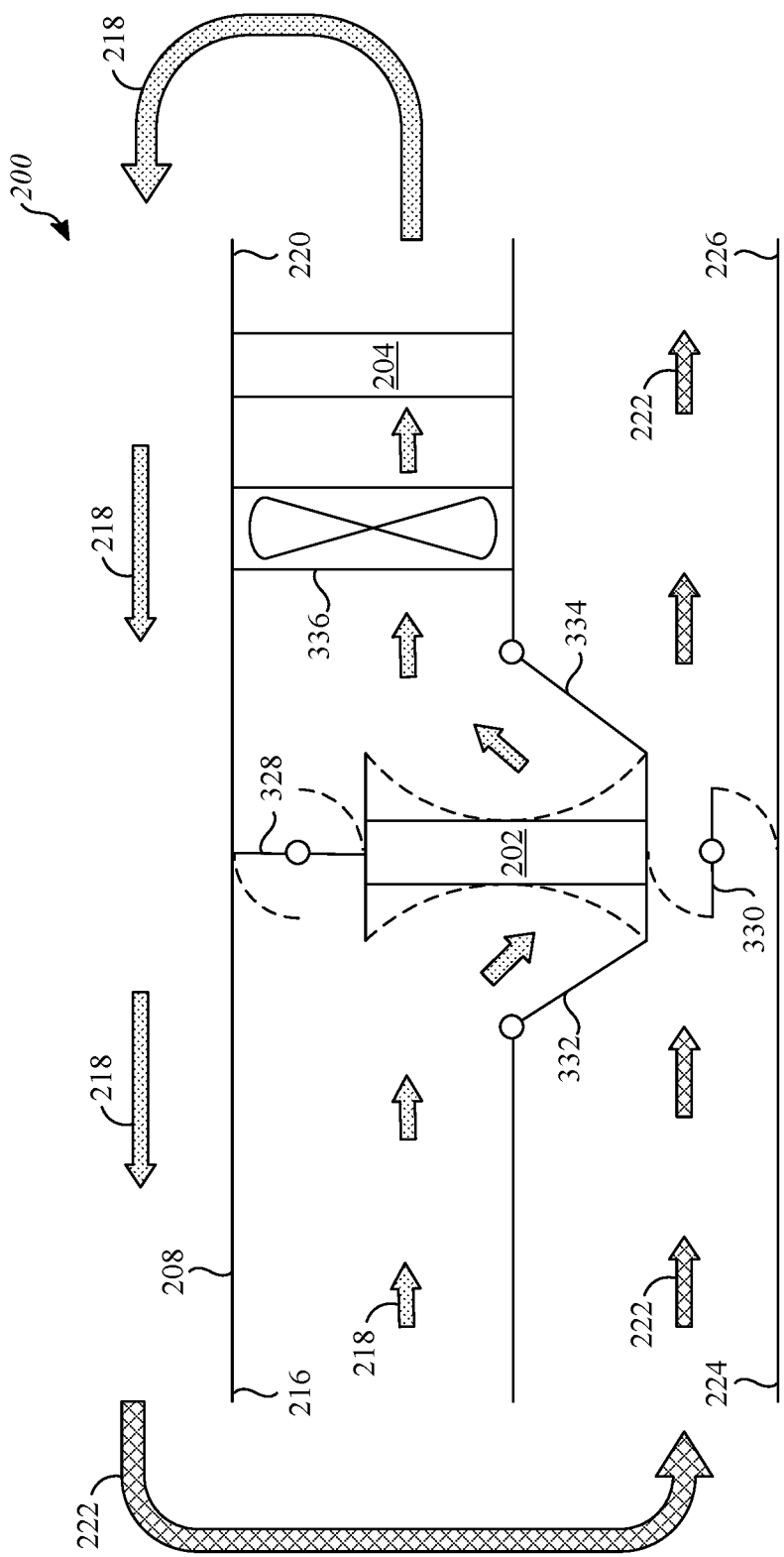
FIG. 3 shows a first operational mode for the thermal control system of FIG. 2.

FIG. 3 shows the thermal control system 200 of FIG. 2 configured in a first operational mode. The housing 208 defines an intake flow path for travel of the intake airflow 218 (shown using dotted arrows) and an exhaust flow path for travel of the exhaust airflow 222 (shown using crosshatched arrows). The heat exchanger 202 is shown in a central position within the housing 208 along both the intake flow path that guides the intake airflow 218 and along the exhaust flow path that guides the exhaust airflow 222. The heat exchanger 204 is shown downstream from the heat exchanger 202, along the intake flow path, though the physical location of the heat exchangers 202, 204 can vary without impacting the operational modes.

The intake airflow 218 enters the housing 208 through the intake inlet 216, passes through the heat exchangers 202, 204, and exits the housing 208 through the intake outlet 220. The intake outlet 220 can direct the intake airflow 218 into a vehicle cabin (not shown) where it mixes with air within the vehicle cabin to become the exhaust airflow 222. The exhaust airflow 222 re-enters the housing 208 through the exhaust inlet 224 and exits the housing 208 through the exhaust outlet 226. The exhaust outlet 226 can direct the exhaust airflow 222 to an external environment (not shown). The locations of the inlets 216, 224, the outlets 220, 226, and the heat exchangers 202, 204 in reference to the housing 208 are schematic. The positions are as shown to enable description of the operational modes of the thermal control system 200 but may vary in physical construction.

The thermal control system 200 includes an intake door 328 disposed adjacent to the heat exchanger 202 along the intake flow path. The intake door 328 can be controlled to move between positions associated with changes in the operational mode of the thermal control system 200. In the first operational mode shown in FIG. 3, the intake door 328 is shown in a closed position that blocks the intake airflow 218 from passing through the intake door 328. The intake door 328 may have a plate-like construction, changing positions by rotating around an axis, or may include shutters, fins, or any other controllable means of directing airflow.

The thermal control system 200 includes an exhaust door 330 disposed adjacent to the heat exchanger 202, on an opposite side of the heat exchanger 202 from the intake door 328, along the exhaust flow path. The exhaust door 330 can also be controlled to move between various positions that change the operational mode of the thermal control system 200. In the first operational mode shown in FIG. 3, the exhaust door 330 is shown in an open position that allows the exhaust airflow 222 to pass through the exhaust door 330 and travel to the exhaust outlet 226. The exhaust door 330 may have a plate-like construction, changing positions by rotating around an axis, or may include shutters, fins, or any other controllable means of directing airflow.

The thermal control system 200 includes a mode door 332 disposed in the housing 208 between the intake flow path and the exhaust flow path upstream of the heat exchanger 202. The mode door 332 can also be controlled to move between various positions that change the operational mode of the thermal control system 200. In the first operational mode shown in FIG. 3, the mode door 332 is shown in a lower position blocking the exhaust airflow 222 from passing through the heat exchanger 202 and allowing the intake airflow 218 to pass through the heat exchanger 202. The mode door 332 may have a plate-like construction, changing positions by rotating around an axis, or may include shutters, fins, or any other controllable means of directing airflow.

The thermal control system 200 includes a blower door 334 disposed in the housing 208 between the intake flow path and the exhaust flow path downstream of the heat exchanger 202 and downstream of the heat exchanger 202. The blower door 334 can also be controlled to move between various positions that change the operational mode of the thermal control system 200. In the first operational mode shown in FIG. 3, the blower door 334 is shown in a lower position directing the intake airflow 218 that passed through the heat exchanger 202 to pass through the heat exchanger 204. The blower door 334 also blocks the exhaust airflow 222 having passed through the exhaust door 330 from entering the intake airflow path. The blower door 334 may have a plate-like construction, changing positions by rotating around an axis, or may include shutters, fins, or any other controllable means of directing airflow.

To maintain movement of the intake airflow 218 through the heat exchangers 202, 204, the thermal control system may include a blower or fan 336. The fan 336 can ensure that the intake airflow 218 is drawn through the heat exchanger 202 and pushed through the heat exchanger 204 so that the intake airflow 218 exits the intake outlet 220 and enters, for example, a vehicle cabin. Though the location of the fan 336 is shown as downstream of the blower door 334 and between the heat exchangers 202, 204, other locations for the fan 336 along the intake flow path are possible without impacting operation of the thermal control system 200 as shown in the first operational mode in FIG. 3.

The first operational mode is represented using the shown positions of the intake door 328 as closed and the exhaust door 330 as open. The mode door 332 is in a lower position blocking the exhaust airflow 222 from entering the heat exchanger 202 while guiding the intake airflow 218 to pass through the heat exchanger 202. The blower door 334 is in a lower position blocking the exhaust airflow 222 from entering the heat exchanger 202 while guiding the intake airflow 218 to pass through the heat exchanger 204. The first operational mode can be used to cool a vehicle cabin. For example, the heat exchanger 202 can be configured to heat or evaporate a working fluid in the thermal loop 212 (FIG. 2) while cooling the intake airflow 218 that passes through or across the heat exchanger 202. The heat exchanger 202 can be an evaporator. In this way, the intake airflow 218 is cooled before continuing along the intake flow path to the heat exchanger 204.

The heat exchanger 204 downstream of the heat exchanger 202 can be configured to cool or condense the working fluid in the thermal loop 212 (FIG. 2) while imparting heat to the intake airflow 218. The heat exchanger 204 can be a gas cooler or condenser. If a cool temperature is desired by the user with the thermal control system 200 in the first operational mode, the amount of heat imparted by the heat exchanger 204 to the intake airflow 218 can be minimal based on a temperature setting for the thermal control system 200. In other words, though the intake airflow 218 is guided by the lower position of the blower door 334 to pass through the heat exchanger 204, little to no heat may be added in order to maintain a cool temperature of the intake airflow 218 as it passes through the intake outlet 220 and into, for example, a vehicle cabin.

Figure 4:
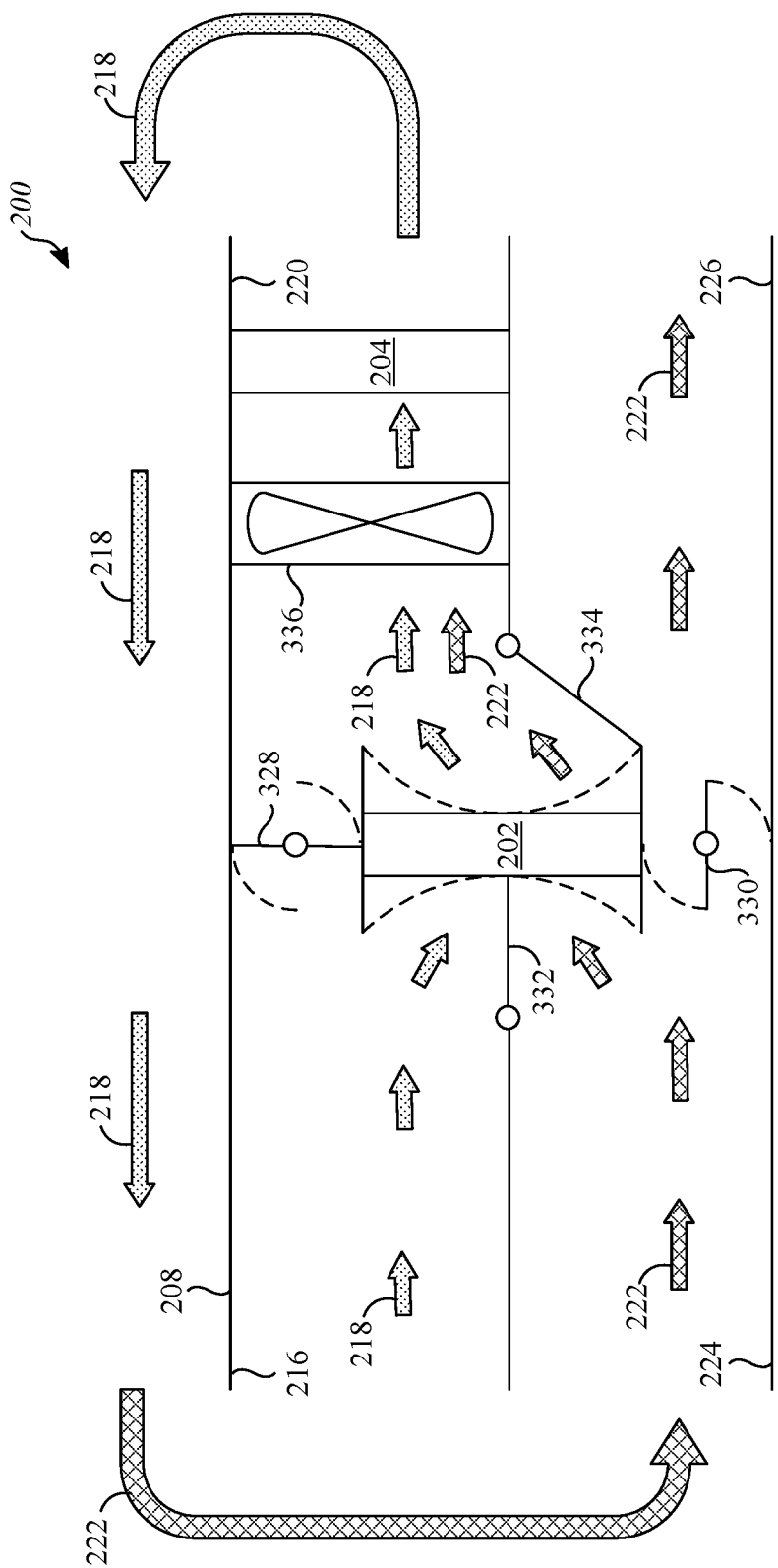
FIG. 4 shows a second operational mode for the thermal control system of FIG. 2.

FIG. 4 shows the thermal control system 200 of FIG. 2 configured in a second operational mode. In the second operational mode, the intake airflow 218 enters the housing 208 through the intake inlet 216, passes through the heat exchangers 202, 204, then exits the housing 208 through the intake outlet 220. The intake outlet 220 directs the intake airflow 218 into a vehicle cabin (not shown) where it mixes with air within the vehicle cabin to become the exhaust airflow 222. The exhaust airflow 222 re-enters the housing 208 through the exhaust inlet 224, then splits. Some or a portion of the exhaust airflow 222 passes through the heat exchangers 202, 204, and some or another portion of the exhaust airflow 222 exits the housing 208 through the exhaust outlet 226. The exhaust outlet 226 can direct the exhaust airflow 222 to an external environment (not shown).

The second operational mode is represented using the shown positions of the intake door 328 as closed and the exhaust door 330 as open. The mode door 332 is in a central position that allows the intake airflow 218 and a first portion of the exhaust airflow 222 to pass through the heat exchanger 202. The blower door 334 is in a lower position that guides the intake airflow 218 and the first portion of the exhaust airflow 222 to pass through the heat exchanger 204 and join along the intake flow path. The blower door 334 also guides or directs a second portion of the exhaust airflow 222, that is, the portion that passed through the exhaust door 330 instead of the heat exchanger 202, to the exhaust outlet 226. The first portion and the second portion of the exhaust airflow 222 may be generally equal portions or may vary depending on size, location, and position of the exhaust door 330 and the mode door 332.

The second operational mode can be used to cool a vehicle cabin, for example, in a very warm external environment. The heat exchanger 202 can be an evaporator that cools both the intake airflow 218 sourced from the intake inlet 216 and a portion of the exhaust airflow 222 directed by the central position of the mode door 332 from the exhaust flow path. The intake airflow 218 and the exhaust airflow 222 can intermix (e.g., blend) downstream of the heat exchanger 202 when the mode door 332 is in the central position and the blower door 334 is in the lower position shown in FIG. 4. The intake airflow 218 and the exhaust airflow 222 can further intermix when passing through the fan 336. Once this level of mixing is achieved, the blended airflow is referred to again as the intake airflow 218 since it is directed through the intake outlet 220 to enter, for example, the vehicle cabin.

The heat exchanger 204 positioned downstream of the fan 336 can be a gas cooler or condenser. If a cool temperature is desired by the user with the thermal control system 200 in the second operational mode, the amount of heat imparted by the heat exchanger 204 to the intake airflow 218 can be minimal. In other words, though both the intake airflow 218 and a portion of the exhaust airflow 222 are guided by the central position of the mode door 332 and the lower position of the blower door 334 to pass through the heat exchanger 204, little to no heat may be added in order to maintain a cool temperature for the intake airflow 218 as it passes through the intake outlet 220 into the vehicle cabin. Dividing the exhaust airflow 222 between the intake flow path and the exhaust flow path is a form of partial recirculation and dehumidification meant to lower the work done by the heat exchanger 202 required to keep the vehicle cabin at a cooler temperature in a warm or very warm environment while still introducing fresh air, for example, from the intake inlet 216.

Figure 5:
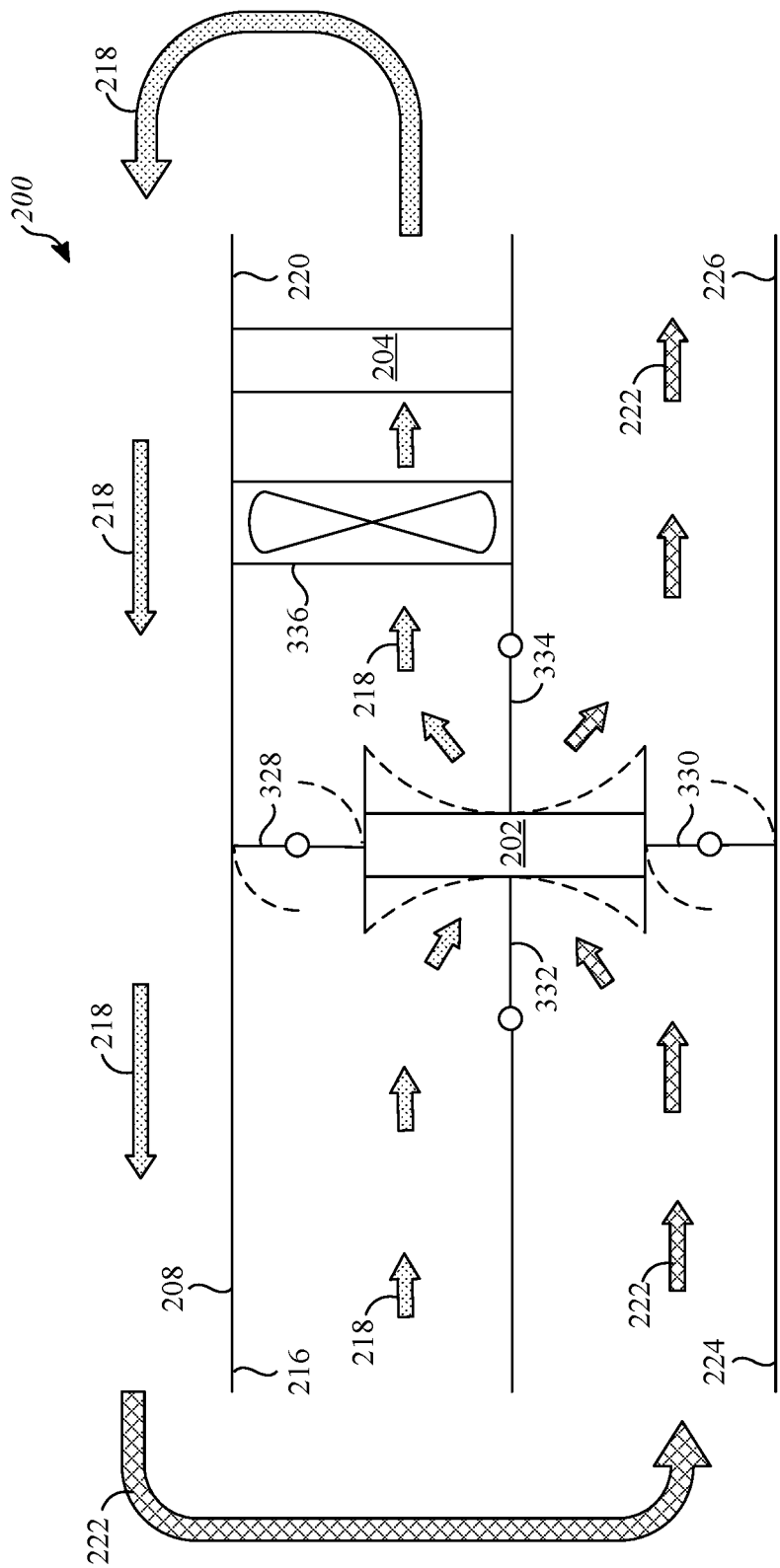
FIG. 5 shows a third operational mode for the thermal control system of FIG. 2.

FIG. 5 shows the thermal control system 200 of FIG. 2 configured in a third operational mode. In the third operational mode, the intake airflow 218 enters the housing 208 through the intake inlet 216, passes through the heat exchangers 202, 204, then exits the housing 208 through the intake outlet 220. The intake outlet 220 directs the intake airflow 218 into a vehicle cabin (not shown) where it mixes with air within the vehicle cabin to become the exhaust airflow 222. The exhaust airflow 222 re-enters the housing 208 through the exhaust inlet 224, passes through the heat exchanger 202, then exits the housing 208 through the exhaust outlet 226. The exhaust outlet 226 can direct the exhaust airflow 222 to an external environment (not shown).

The third operational mode is represented using the shown positions of the intake door 328 as closed and the exhaust door 330 as closed. The mode door 332 is in a central position that allows the intake airflow 218 and the exhaust airflow 222 to pass through the heat exchanger 202. The blower door 334 is in a central position that guides the intake airflow 218 to pass through the heat exchanger 204 and the exhaust airflow 222 to the exhaust outlet 226. In the third operational mode shown in FIG. 5, the intake airflow 218 and the exhaust airflow 222 do not intermix within or downstream of the heat exchanger 202, though both pass through the heat exchanger 202.

The third operational mode can be used to heat and/or de-humidify a vehicle cabin while at the same time reclaiming or capturing heat from the exhaust airflow 222 for re-use within the thermal control system 200 or for other uses in the vehicle, for example, in a cool or cold external environment. The heat exchanger 202 can be an evaporator that dehumidifies the intake airflow 218 from the intake inlet 216. The heat exchanger 204 is positioned downstream of the heat exchanger 202 in the intake flow path and can be a gas cooler or condenser. When a warm temperature is desired by the user with the thermal control system 200 in the third operational mode, the heat exchanger 204 can impart a sufficient amount of heat to the intake airflow 218 to warm a vehicle cabin.

When the vehicle cabin is warm, the exhaust airflow 222 brought into the housing 208 through the exhaust inlet 224 from the vehicle cabin will also be warm, and the heat exchanger 202 (e.g., an evaporator) can collect or reclaim heat from the exhaust airflow 222 before the exhaust airflow 222 is directed to the exhaust outlet 226, for example, to pass to the external environment. Both the intake airflow 218 and the exhaust airflow 222 are directed and kept separate by the central positions of the mode door 332 and the blower door 334. That is, the intake airflow 218 and the exhaust airflow 222 do not intermix within or downstream of the heat exchanger, allowing the heat exchanger 202 both to dehumidify the intake airflow 218 and reclaim heat from the exhaust airflow 222.

Figure 6:
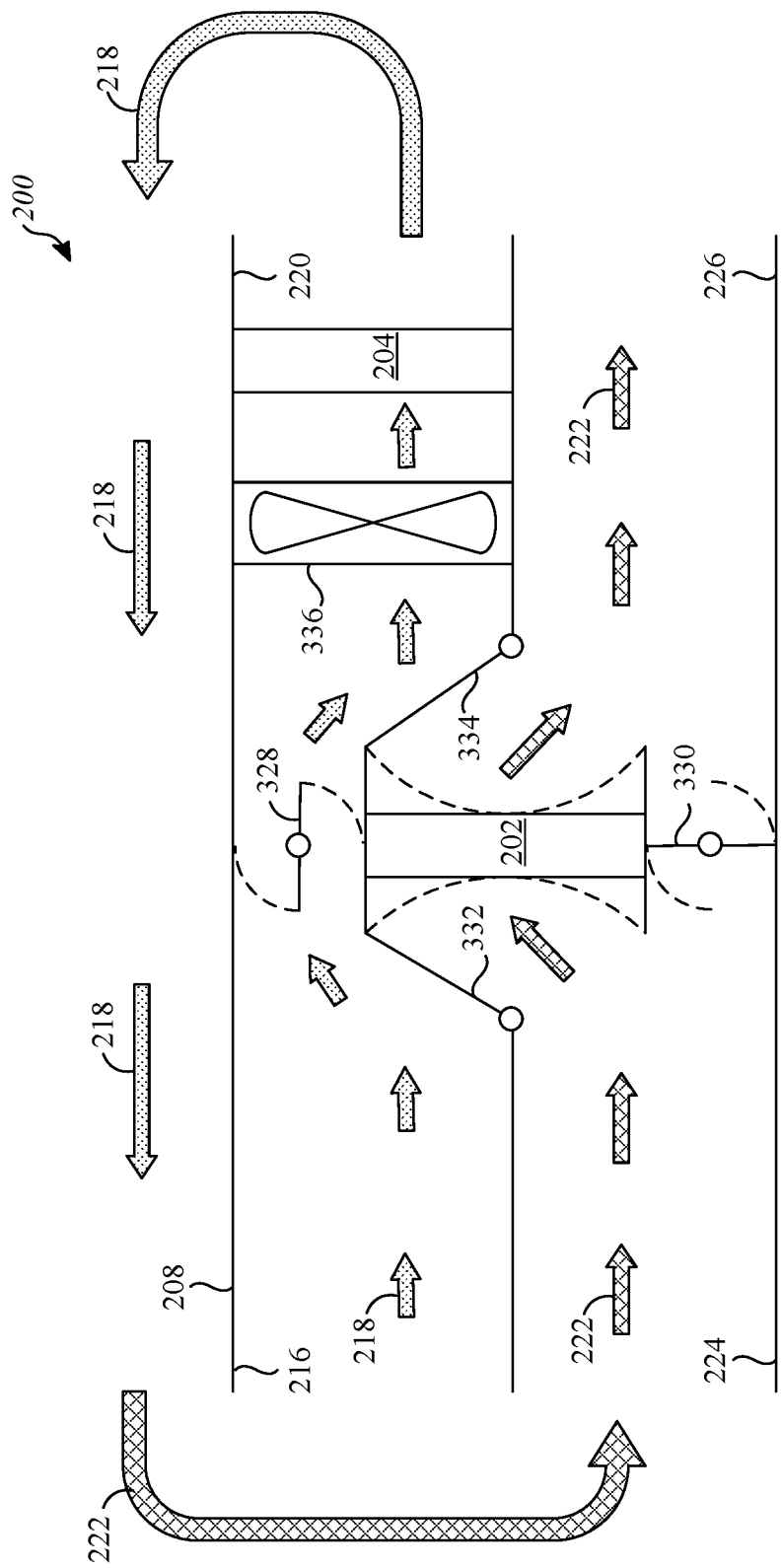
FIG. 6 shows a fourth operational mode for the thermal control system of FIG. 2.

FIG. 6 shows the thermal control system 200 of FIG. 2 configured in a fourth operational mode. In the fourth operational mode, the intake airflow 218 enters the housing 208 through the intake inlet 216, passes through the intake door 328 and the heat exchanger 204, then exits the housing 208 through the intake outlet 220. The intake outlet 220 directs the intake airflow 218 into a vehicle cabin (not shown) where it mixes with air within the vehicle cabin to become the exhaust airflow 222. The exhaust airflow 222 re-enters the housing 208 through the exhaust inlet 224, passes through the heat exchanger 202, then exits the housing 208 through the exhaust outlet 226. The exhaust outlet 226 can direct the exhaust airflow 222 to an external environment (not shown).

The fourth operational mode is represented using the shown positions of the intake door 328 as open and the exhaust door 330 as closed. The mode door 332 is in an upper position that blocks the intake airflow 218 from passing through the heat exchanger 202 and routes the intake airflow 218 though the intake door 328. The blower door 334 is also in an upper position that guides the intake airflow 218 downstream of the intake door 328 to pass through the heat exchanger 204 before the intake airflow 218 exits the intake outlet 220 to enter, for example, a vehicle cabin. The upper positions of the mode door 332 and the blower door 334 along with the closed position of the exhaust door 330 guide the exhaust airflow 222 through the heat exchanger 202 before the exhaust airflow 222 exits the exhaust outlet 226.

The fourth operational mode can be used to heat a vehicle cabin while at the same time reclaiming or capturing heat from the exhaust airflow 222 for re-use within the thermal control system 200 or for other uses in the vehicle, for example, in a very cold external environment. When a warm temperature is desired by the user with the thermal control system 200 in the fourth operational mode, the heat exchanger 204 can impart a sufficient amount of heat to the intake airflow 218 to warm a vehicle cabin. To this end, the heat exchanger 204 can be a gas cooler, a resistance heater, a condenser, or combinations thereof. When the vehicle cabin is warm, the exhaust airflow 222 brought into the housing 208 through the exhaust inlet 224 from the vehicle cabin will also be warm. The heat exchanger 202 can collect or reclaim heat from the exhaust airflow 222 before the exhaust airflow 222 is directed to the exhaust outlet 226, for example, to pass to the external environment. To this end, the heat exchanger 202 can be an evaporator.

Figure 7:
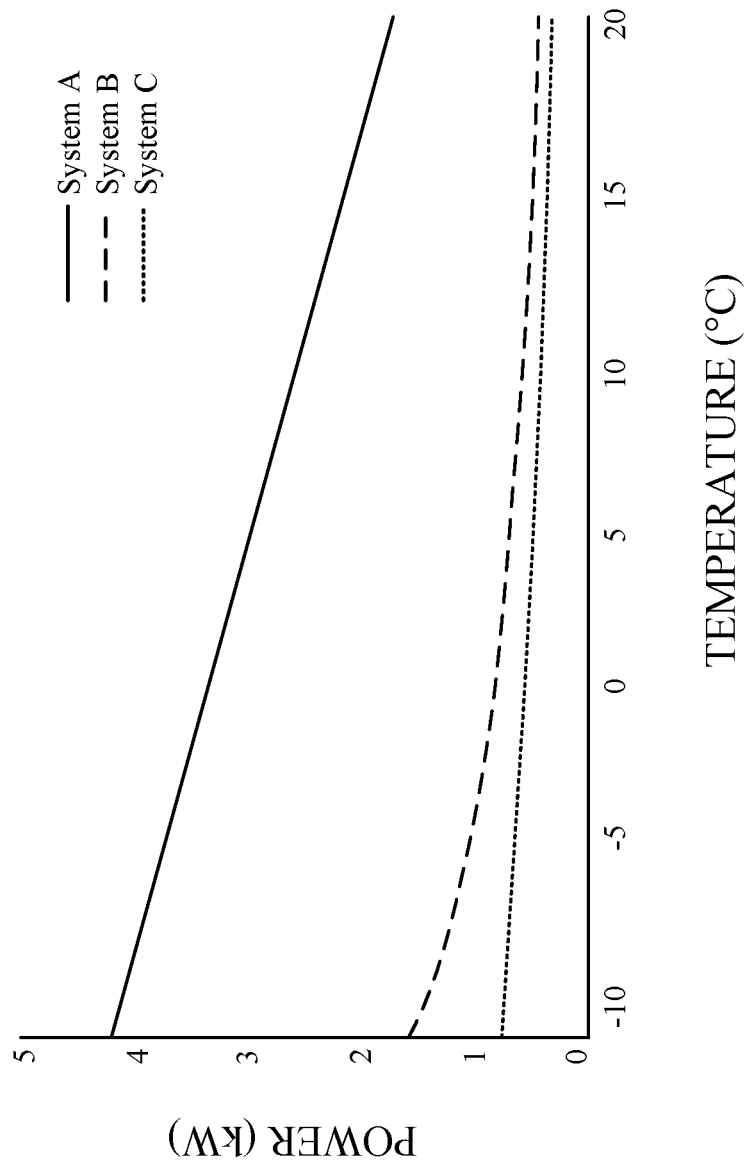
FIG. 7 is a chart showing power consumption versus ambient temperature for various thermal control systems.

FIG. 7 is a chart showing power consumption versus ambient temperature for various thermal control systems. The chart includes data for a PTC system, marked as System A, in a solid line, a traditional heat pump system, marked as System B, in a dashed line, and a heat-pump system that uses heat reclamation such as the thermal control systems 100, 200 described in respect to FIGS. 1-6, marked as System C, in dotted line. Improvements in power consumption, especially at low temperatures, are evident for the heat-pump system using heat reclamation.

The solid line of System A indicates power consumption in kW based on thermal control system operation between −10° C. and 20° C. for a PTC-based thermal control system. Power usage is high, over 4 kW, at the lowest ambient temperature of −10° C. Power usage is approximately 2 kW at the highest shown ambient temperature of 20° C. The dashed line of System B indicates power consumption in kW based on thermal control system operation between −10° C. and 20° C. for a heat-pump-based thermal control system. Power usage is between 1.5 kW and 2 kW at the lowest ambient temperature of −10° C. Power usage is between 0.5 kW and 1 kW at the highest shown ambient temperature of 20° C. Improvement is evident in overall lower power consumption possible using a heat-pump-based thermal control system over a PTC-based thermal control system.

Further improvement in power consumption is possible when using heat-pump systems with heat reclamation such as the thermal control systems 100, 200 described herein. The dotted line of System C indicates power consumption in kW based on thermal control system operation between −10° C. and 20° C. for a heat-pump-based thermal control system with heat reclamation. Power usage is between 0.5 kW and 1 kW at the lowest ambient temperature of −10° C. Power usage is between 0 kW and 0.5 kW at the highest shown ambient temperature of 20° C. Lower power consumption is especially useful when operating a hybrid-electric or electric vehicle, as more power is available to the overall vehicle, extending operating range.

Figure 8:
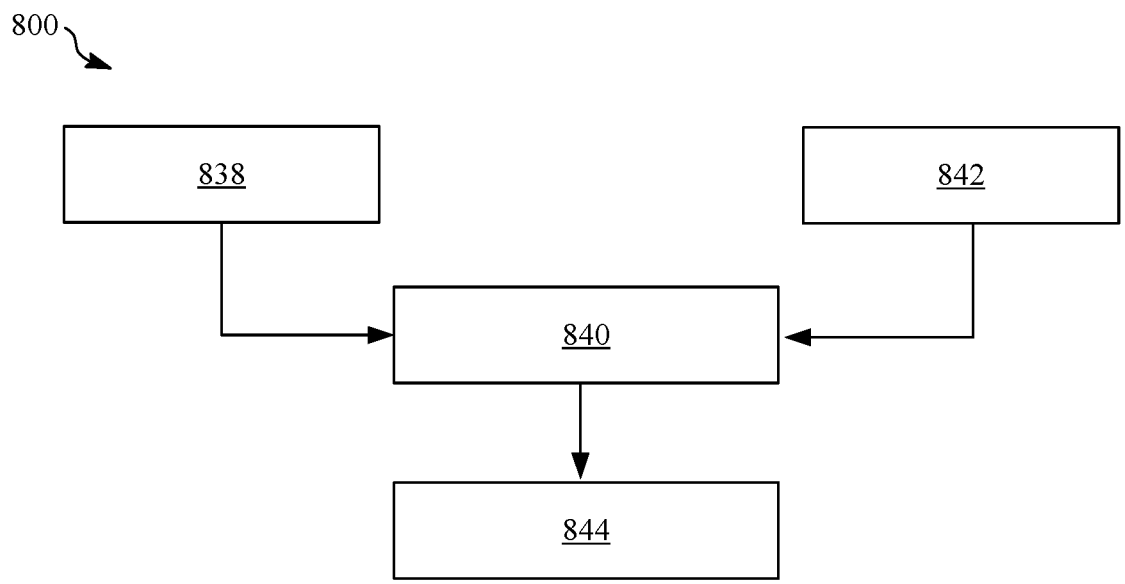
FIG. 8 is a block diagram of a thermal control system.

FIG. 8 is a block diagram that shows a thermal control system 800. The thermal control system 800 can include a user interface 838, a controller 840, sensors 842, and a heating, ventilation, and air conditioning (HVAC) module 844. The thermal control system 800 can operate in a manner similar to the thermal control systems 100, 200 described in reference to FIGS. 1-6. The HVAC module 844 can include one or more housings, heat exchangers, flow paths, and/or doors that direct and condition intake airflow and exhaust airflow for the thermal control system 800.

The user interface 838 allows a user to modify aspects of the operation of the thermal control system 800 and to set operational modes for the HVAC module 844. For example, various operational modes can result in heating, cooling, recirculating, dehumidifying, or otherwise conditioning or reclaiming heat from intake and exhaust airflows using the HVAC module 844. That is, the user interface 838 can allow modification of operating parameters of the HVAC module 844, for example, based on user preferences.

The controller 840 coordinates operation of the thermal control system 800 by communicating electronically (e.g., using wired or wireless communications) with the user interface 838, the sensors 842, and the HVAC module 844. The controller 840 may receive information (e.g., signals and/or data) from the user interface 838, from the sensors 842, and/or from other portions (not shown) of the thermal control system 800.

The sensors 842 may capture or receive information related, for example, to an external environment where the thermal control system 800 is located. The external environment can be an exterior or an interior of a vehicle or an office, and information captured or received by the sensors 842 can relate to temperature, humidity, airflow, or other ambient conditions within the vehicle or the office or exterior to the vehicle or the office.

The thermal control system 800 can change an operational mode of the HVAC module 844 based on a control signal, such as a signal from the controller 840. The control signal may cause the HVAC module 844 to vary door positions, airflow paths, airflow volumes, blower speeds, air temperatures, humidity levels, heat exchanger operation, etc. For example, a control signal can cause the HVAC module 844 to change from a first operational mode where fresh intake airflow follows a flow path passing through an evaporator and a gas cooler prior to entering a vehicle cabin to a second operational mode where fresh intake airflow follows a flow path passing through a gas cooler prior to entering the vehicle cabin. In the second operational mode, the vehicle cabin air can follow a flow path passing through an evaporator to reclaim heat for use in the vehicle prior to exiting the vehicle cabin through an exhaust duct to an external environment. Various technologies that may be used to implement the thermal control system 800 include thermal loops; heat exchangers such as condensers, gas coolers, and evaporators; fans; compressors; expansion devices such as nozzles; ducts; vents; blend doors; etc.

Figure 9:
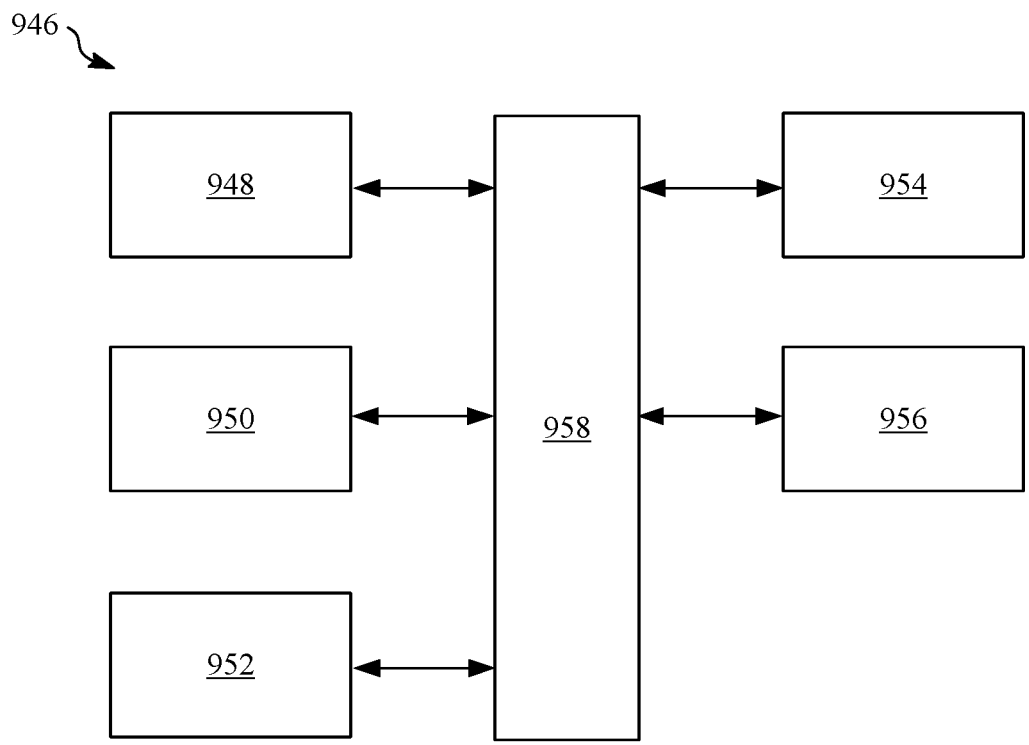
FIG. 9 is an illustration showing an example of a hardware configuration for a controller.

FIG. 9 shows an example of a hardware configuration for a controller 946 that may be used to implement the controller 840 and/or other portions of the thermal control system 800. In the illustrated example, the controller 946 includes a processor 948, a memory device 950, a storage device 952, one or more input devices 954, and one or more output devices 956. These components may be interconnected by hardware such as a bus 958 that allows communication between the components.

The processor 948 may be a conventional device such as a central processing unit and is operable to execute computer program instructions and perform operations described by the computer program instructions. The memory device 950 may be a volatile, high-speed, short-term information storage device such as a random-access memory module. The storage device 952 may be a non-volatile information storage device such as a hard drive or a solid-state drive. The input devices 954 may include sensors and/or any type of human-machine interface, such as buttons, switches, a keyboard, a mouse, a touchscreen input device, a gestural input device, or an audio input device. The output devices 956 may include any type of device operable to provide an indication to a user regarding an operating mode or state, such as a display screen, an interface for a thermal control system such as the thermal control systems 100, 200, 800, or an audio output.

As described above, one aspect of the present technology is the gathering and use of data available from various sources, such as from sensors 842 or user profiles, to improve the function of thermal control systems such as the thermal control systems 100, 200, 800. The present disclosure contemplates that in some instances, this gathered data may include personal information data that uniquely identifies or can be used to contact or locate a specific person. Such personal information data can include demographic data, location-based data, telephone numbers, email addresses, twitter IDs, home addresses, data or records relating to a user's health or level of fitness (e.g., vital signs measurements, medication information, exercise information), date of birth, or any other identifying or personal information.

The present disclosure recognizes that the use of personal information data, in the present technology, can be used to the benefit of users. For example, the personal information data can be used to deliver changes to operational modes of thermal control systems to best match user preferences. Other uses for personal information data that benefit the user are also possible. For instance, health and fitness data may be used to provide insights into a user's general wellness or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users and should be updated as the collection and/or use of data changes. Personal information from users should be collected for legitimate and reasonable uses of the entity and not shared or sold outside of those legitimate uses. Further, such collection/sharing should occur after receiving the informed consent of the users.

Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of user-profile-based cabin temperature regulation through a thermal control system, the present technology can be configured to allow users to select to "opt in" or "opt out" of participation in the collection of personal information data during registration for services or anytime thereafter. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can be implemented without the need for accessing such personal information data. That is, the various embodiments of the present technology are not rendered inoperable due to the lack of all or a portion of such personal information data. For example, changes in operational modes in thermal control systems can be implemented for a given user by inferring user preferences based on non-personal information data, a bare minimum amount of personal information, other non-personal information available to the system, or publicly available information.

What is claimed is:

1. A thermal control system, comprising:
    a housing defining an intake flow path for travel of intake airflow and an exhaust flow path for travel of exhaust airflow;
    an intake door disposed in the housing along the intake flow path, the intake door having a first position blocking the intake airflow from passing through the intake door and a second position allowing the intake airflow to pass through the intake door;
    an exhaust door disposed in the housing along the exhaust flow path, the exhaust door having a first position blocking the exhaust airflow from passing through the exhaust door and a second position allowing the exhaust airflow to pass through the exhaust door; and
    a mode door disposed in the housing between the intake flow path and the exhaust flow path, the mode door having:
        a first position blocking the intake airflow from passing through a heat exchanger and allowing the exhaust airflow to pass through the heat exchanger;

a second position blocking the exhaust airflow from passing through the heat exchanger and allowing the intake airflow to pass through the heat exchanger; and a third position allowing the intake airflow and the exhaust airflow to pass through the heat exchanger, wherein the housing is configured such that when the intake door is in the second position and the mode door is in the first position, the intake airflow bypasses the heat exchanger, and wherein the housing is further configured such that when the exhaust door is in the second position and the mode door is in the second position, the exhaust airflow bypasses the heat exchanger.

2. The thermal control system of claim 1, wherein the intake flow path extends from an intake inlet receiving the intake airflow from an external environment to an intake outlet directing the intake airflow into a vehicle cabin.

3. The thermal control system of claim 2, wherein the exhaust flow path extends from an exhaust inlet receiving the exhaust airflow from the vehicle cabin to an exhaust outlet directing the exhaust airflow to the external environment.

4. The thermal control system of claim 1, further comprising:
a thermal loop circulating a working fluid, wherein the heat exchanger is part of the thermal loop and is configured to heat or evaporate the working fluid while cooling the intake airflow and the exhaust airflow that passes through the heat exchanger.

5. The thermal control system of claim 4, wherein the heat exchanger is an evaporator.

6. The thermal control system of claim 1, wherein the heat exchanger is a first heat exchanger, further comprising:
a blower door disposed in the housing along the intake flow path and the exhaust flow path downstream from the mode door, the blower door having:
a first position directing the intake airflow that passed through the intake door to pass through a second heat exchanger, the second heat exchanger disposed in the intake flow path;
a second position directing the exhaust airflow that passed through the exhaust door along the exhaust flow path, the second position further directing the intake airflow that passed through the first heat exchanger to pass through the second heat exchanger; and
a third position directing the intake airflow that passed through the first heat exchanger to pass through the second heat exchanger, the third position further directing the exhaust airflow that passed through the first heat exchanger along the exhaust flow path.

7. The thermal control system of claim 6, wherein the intake airflow and the exhaust airflow do not intermix within or downstream of the first heat exchanger when the mode door and the blower door are in the respective third positions.

8. The thermal control system of claim 6, wherein the intake airflow and the exhaust airflow intermix downstream of the first heat exchanger when the mode door is in the third position and the blower door is in the second position.

9. The thermal control system of claim 6, further comprising:
a thermal loop circulating a working fluid,
wherein the first heat exchanger is part of the thermal loop and is configured to heat or evaporate the working fluid while cooling the intake airflow and the exhaust airflow that passes through the first heat exchanger, and wherein the second heat exchanger is part of the thermal loop and is configured to cool or condense the working fluid while heating the intake airflow or the exhaust airflow that passes through the second heat exchanger.

10. The thermal control system of claim 6, further comprising:
a compression device disposed between the first heat exchanger and the second heat exchanger in a thermal loop, the compression device configured to pressurize a working fluid in the thermal loop; and
an expansion device disposed between the second heat exchanger and the first heat exchanger in the thermal loop, the expansion device configured to de-pressurize the working fluid in the thermal loop.

11. A thermal control system, comprising:
a thermal module defining an intake flow path for travel of intake airflow and an exhaust flow path for travel of exhaust airflow;
a thermal loop circulating a working fluid and including a first heat exchanger configured to heat the working fluid and a second heat exchanger configured to cool the working fluid,
wherein the first heat exchanger is positioned in the intake flow path and in the exhaust flow path and is configured to cool the intake airflow and the exhaust airflow that passes through the first heat exchanger, and
wherein the second heat exchanger is positioned downstream of the first heat exchanger in the intake flow path and is configured to heat the intake airflow that passes through the second heat exchanger; and
a mode door disposed in the thermal module between the intake flow path and the exhaust flow path, the mode door having:
a first position configured to route the intake airflow to bypass the first heat exchanger and pass through the second heat exchanger, the first position further configured to route the exhaust airflow to pass through the first heat exchanger;
a second position configured to route the exhaust airflow to bypass the first heat exchanger, the second position further configured to route the intake airflow to pass through the first heat exchanger and the second heat exchanger; and
a third position configured to route the intake airflow and the exhaust airflow to pass through the first heat exchanger.

12. The thermal control system of claim 11, wherein the intake flow path extends from an intake inlet receiving the intake airflow from an external environment to an intake outlet directing the intake airflow into a vehicle cabin.

13. The thermal control system of claim 12, wherein the exhaust flow path extends from an exhaust inlet receiving the exhaust airflow from the vehicle cabin to an exhaust outlet directing the exhaust airflow to the external environment.

14. The thermal control system of claim 11, wherein the first heat exchanger is an evaporator and the second heat exchanger is a gas cooler, a resistance heater, or a condenser.

15. The thermal control system of claim 11, further comprising:
an intake door disposed in the thermal module along the intake flow path, the intake door having a first position configured to block the intake airflow from passing through the intake door and a second position configured to allow the intake airflow to pass through the intake door; and an exhaust door disposed in the thermal module along the exhaust flow path, the exhaust door having a first position configured to block the exhaust airflow from passing through the exhaust door and a second position configured to allow the exhaust airflow to pass through the exhaust door.

16. The thermal control system of claim 15, further comprising:
   a blower door disposed in the thermal module between the intake flow path and the exhaust flow path downstream from the mode door, the blower door having:
      a first position configured to direct the intake airflow that passed through the intake door to pass through the second heat exchanger;
      a second position configured to direct the exhaust airflow that passed through the exhaust door along the exhaust flow path and configured to direct the exhaust airflow that passed through the first heat exchanger to pass through the second heat exchanger and join the intake airflow along the intake flow path; and
      a third position configured to direct the intake airflow that passed through the first heat exchanger to pass through the second heat exchanger and configured to direct the exhaust airflow that passed through the first heat exchanger along the exhaust flow path.

17. The thermal control system of claim 16, wherein the intake airflow and the exhaust airflow do not intermix within or downstream of the first heat exchanger when the mode door and the blower door are in the respective third positions.

18. The thermal control system of claim 16, wherein the intake airflow and the exhaust airflow intermix downstream of the first heat exchanger when the mode door is in the third position and the blower door is in the second position.

19. A thermal system comprising:
   a housing that defines an intake flow path for travel of intake airflow and an exhaust flow path for travel of exhaust airflow;
   a heat exchanger that is disposed in the housing, the heat exchanger occupying a portion of the intake flow path and a portion of the exhaust flow path; and
   a mode door disposed in the housing upstream of the heat exchanger, the mode door having:
      a first position configured to route the intake airflow through a portion of the intake flow path not occupied by the heat exchanger and configured to route the exhaust airflow to pass through the heat exchanger;
      a second position configured to route the exhaust airflow through a portion of the exhaust flow path not occupied by the heat exchanger and configured to route the intake airflow to pass through the heat exchanger; and
      a third position between the first position and the second position, the third position configured to route the intake airflow and the exhaust airflow to pass through the heat exchanger.

20. The thermal system of claim 19, wherein the heat exchanger is a first heat exchanger, the thermal system further comprising:
   a second heat exchanger that is disposed in the housing downstream from the first heat exchanger, the second heat exchanger occupying the intake flow path.

21. The thermal system of claim 20, further comprising:
   an intake door disposed in the second portion of the intake flow path, the intake door having a first position configured to block the intake airflow from passing through the intake door and a second position configured to allow the intake airflow to pass through the intake door;
   an exhaust door disposed in the second portion of the exhaust flow path, the exhaust door having a first position configured to block the exhaust airflow from passing through the exhaust door and a second position configured to allow the exhaust airflow to pass through the exhaust door.

22. The thermal system of claim 21, further comprising:
   a blower door disposed in the housing downstream of the first heat exchanger, the blower door having:
      a first position configured to route the intake airflow that passes through the intake door to pass through the second heat exchanger;
      a second position configured to route the intake airflow and the exhaust airflow that passes through the first heat exchanger to pass through the second heat exchanger; and
      a third position configured to route the intake airflow that passes through the first heat exchanger to pass through the second heat exchanger and configured to route the exhaust airflow that passes through the first heat exchanger along the exhaust flow path.

* * * * *